(No Model.)

J. C. SCHOENTHALER.
CHRISTMAS TREE HOLDER.

No. 345,925. Patented July 20, 1886.

Attest:
J. Henry Schmidt
Chas. E. Metz.

Inventor:
John C. Schoenthaler
per. Chas. F. Meisner
Attorney.

UNITED STATES PATENT OFFICE.

JOHN C. SCHOENTHALER, OF ST. LOUIS, MISSOURI.

CHRISTMAS-TREE HOLDER.

SPECIFICATION forming part of Letters Patent No. 345,925, dated July 20, 1886.

Application filed December 26, 1885. Serial No. 186,823. (No model.)

*To all whom it may concern:*

Be it known that I, JOHN C. SCHOENTHALER, a citizen of the United States, residing at St. Louis, in the State of Missouri, have invented certain new and useful Improvements in Christmas-Tree Holders, of which the following is a specification.

My invention is specially intended as a holder for Christmas-trees, but may be used for other similar purposes.

The object of my invention is to make a neat, durable, as well as ornamental holder, which is adjustable for holding trees having thicker or thinner trunks, as well as others whose trunks are crooked or twisted, so as to keep the tree firm and plumb.

To this end my improvements consist of three adjustable prongs or grippers, hinged at their lower inner corner to lugs which form part of a cast-iron bed-piece, having screw-holes at which it is screwed and fastened to the floor of the room, or to the wood frame or board upon which the tree is usually placed. The prongs or grippers are operated and adjusted to grip different-sized trunks or stems of trees by means of a thumb-screw each, which latter passes through a tail end of said prongs opposite the hinged end and reacts on the bed-piece. The bed-plate is provided with a hub in its center for receiving the lower end of the tree after it is trimmed down to fit it, and to hold it in place after the prongs have been brought up tight against the trunk.

To more fully describe the construction and operation of my improved holder, and to enable others to fully understand and use it, reference is had to the accompanying drawings, in which—

Figure 1:
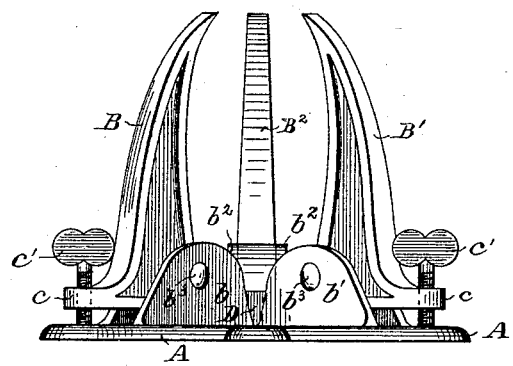
Figure 2:
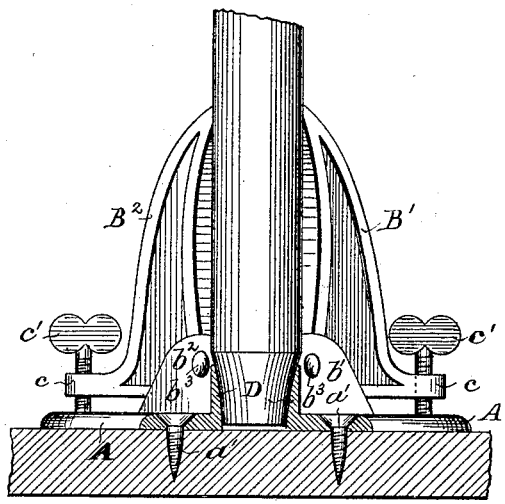
Figure 3:
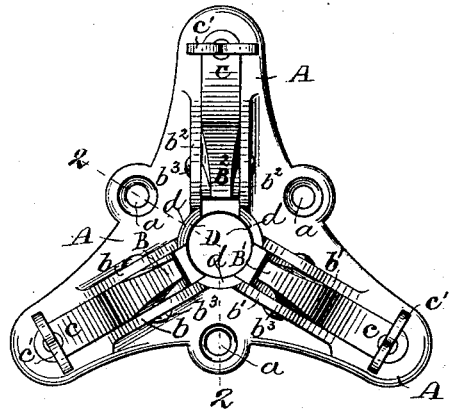

Figure 1 is a side elevation of my improved holder without the tree. Fig. 2 is a section of same on line 2 2 of Fig. 3, the stem or trunk of a tree being shown held by two prongs or grippers, the third being removed. Fig. 3 is a plan view of Fig. 1.

Similar letters indicate similar parts in all the views.

A is a plate or bed-piece, preferably cast of the triangular shape shown in Fig. 3.

$a$ are three screw-holes, through which the screws $a'$ pass, which fasten the plate to the floor or frame.

On the plate A are cast three double lugs, $b$, $b'$, and $b^2$, one at each corner or angle. These lugs serve as a journal or fulcrum each for the respective prongs B, B', and B², and they are cast in such positions on said plate A that a circle whose circumference passes through the pins $b^3$ of the three lugs will have its center in the center of the plate. The three screw-holes $a$ are placed half-way between the lugs and around the same center. The prongs or grippers B, B', and B² are hinged at their lower inner ends within the lugs, and have each a tail, $c$, at the opposite or outer lower ends, through which a vertical thumb or set screw, $c'$, operates, which latter rests and acts on the bed-plate, and when turned raises or lowers the tail end of its respective prong, which in turn brings the upper end of its prong closer to or farther from the trunk of the tree. Thus each prong can be separately and independently adjusted.

The prongs are preferably made of the shape shown in the drawings—viz, the upper end being tapered at the sides and curved inwardly, so as to form a claw for embedding itself into the trunk of the tree. The body is gradually increased in width and thickness downward for adding strength at the body and fulcrum, and its base is straight and at right angle to a line drawn from the point or claw down through the point of fulcrum, thus giving to the prongs a neat and symmetrical appearance, combined with strength and saving of metal.

D is a hub cast on the center of the plate A, and forms part of it, and admits the lower end of the tree-trunk, as clearly shown in Fig. 2.

In operation my improved holder works similarly to the ordinary clutch devices, the prongs or grippers being first spread apart to admit the stem of the tree, the lower end of which is tapered down beforehand so that it will enter the hub. The prongs or grippers are then brought to bear against the tree by turning the thumb-screw below, so as to raise the tail end. Should the tree be crooked or twisted, it may still be held plumb by letting back one or two prongs or grippers and following up with the other two or one, respectively.

In order to facilitate the casting of the bed-piece, the double lugs are cast in such a manner that one side of each lug is connected at the inner end with the side opposite to it of the adjoining lug by a segmental rib, $d$, as clearly shown in Fig. 3, the segmental points of connection thus forming the hub D, for the reception of the end of the tree. The space between the two sides of the lugs themselves is left open, thus permitting the inside faces of the sides to be properly finished and cleaned after cast, to admit of the reception and free movement of the respective prongs. By this construction a saving of material is also effected without diminishing the strength of the hub.

The peculiar shape of the plate or bed-piece, as shown in the drawings, and the positions of the lugs and screw-holes, as shown and described, are preferred for adding beauty and neatness to the appearance of the article, as well as being a further saving of material in casting, and a consequent reduction in weight of the article itself.

What I claim is—

1. In a Christmas-tree holder, the plate or bed-piece A, having the lugs $b, b'$, and $b^2$, for the reception of the respective prongs or grippers B, B', and B², in combination with the prongs or grippers B, B', and B², hinged in the lugs $b, b'$, and $b^2$, respectively, and provided with a tail end, $c$, each, and a thumb-screw, $c'$, passing through each tail and acting on the bed-piece, for the purpose of adjusting the said prongs and causing them to firmly grip and hold a tree, as herein shown and described.

2. The combination, in a Christmas-tree holder provided with adjustable prongs for gripping a trunk of a tree, of the double lugs, $b, b'$, and $b^2$, the segmental ribs $d$, and the bed-piece or plate A, to form the hub D, substantially as and for the purpose set forth.

JOHN C. SCHOENTHALER.

Witnesses:
CHAS. F. MEISNER,
J. HENRY SCHMIDT.